US010279628B2

(12) United States Patent
Seljan et al.

(10) Patent No.: US 10,279,628 B2
(45) Date of Patent: May 7, 2019

(54) COMBINATION ONE-PIECE MOLDED TIRE AND MOUNTING PLATE

(71) Applicant: Mach II Company, LLC, Lake Mills, WI (US)

(72) Inventors: Scott P. Seljan, Lake Mills, WI (US); Jeffrey J. Seljan, Lake Mills, WI (US); Robert D. Laws, Lake Mills, WI (US); Aaron W. Smith, Lake Mills, WI (US); Marc J. Pelchat, Lake Mills, WI (US)

(73) Assignee: Mach II Company, LLC, Lake Mills, WI (US)

( * ) Notice: Subject to any disclaimer, the term of this patent is extended or adjusted under 35 U.S.C. 154(b) by 128 days.

(21) Appl. No.: 15/354,225

(22) Filed: Nov. 17, 2016

(65) Prior Publication Data
US 2018/0134084 A1    May 17, 2018

(51) Int. Cl.
*B60C 7/26* (2006.01)
*B60C 11/03* (2006.01)
*B60C 7/00* (2006.01)

(52) U.S. Cl.
CPC ............ *B60C 7/26* (2013.01); *B60C 11/0311* (2013.01); *B60C 2007/005* (2013.01); *B60C 2200/08* (2013.01)

(58) Field of Classification Search
CPC . B60C 7/26; B60C 11/0811; B60C 2007/005; B60C 2200/08
USPC ... 301/11.1, 64.201, 64.202, 64.304, 64.305, 301/64.706, 87; 152/379.3, 379.5, 382, 152/388, 397
See application file for complete search history.

(56) References Cited

U.S. PATENT DOCUMENTS

| 5,601,343 | A * | 2/1997 | Hoffken | B60B 1/06 301/111.04 |
| 5,939,002 | A * | 8/1999 | Heindel | B29D 30/0606 249/56 |
| 6,454,361 | B1 * | 9/2002 | Martin | A63C 17/22 301/37.22 |
| 8,567,461 | B2 * | 10/2013 | Williams | B60C 7/18 152/30 |
| 2007/0120416 | A1 * | 5/2007 | Pusch | B60B 33/0028 301/64.304 |

OTHER PUBLICATIONS

Beall, Glenn L. Rotational Molding: Design, Materials, Tooling, and Processing, © 1998, Hanser Publications (Cincinnati, Ohio), ISBN 9781569902608 (Book).
Mondini, F., Rombol, E., et al "Rotational Moulding: Theory & Practice," © 2009, Association of Rotational Moulders Australasia (Ipswich, QLD, Australia) (Book).

* cited by examiner

*Primary Examiner* — S. Joseph Morano
*Assistant Examiner* — Jean W Charleston
(74) *Attorney, Agent, or Firm* — Joseph T. Leone, Esq.; DeWitt LLP

(57) ABSTRACT

A combination tire and mounting plate are described. The tire portion of the combination is a molded, one-piece, non-pneumatic tire, preferably made by rotational molding. The mounting plate portion of the combination has a central aperture therein and is configured to be coupled to a conventional hub. The combination further includes a fastener dimensioned to attach the mounting plate to the tire so that the central aperture of the mounting plate is coaxial with the central aperture of the tire. This permits the tire/mounting plate combination to be reversibly mounted coaxially on a conventional hub.

8 Claims, 14 Drawing Sheets

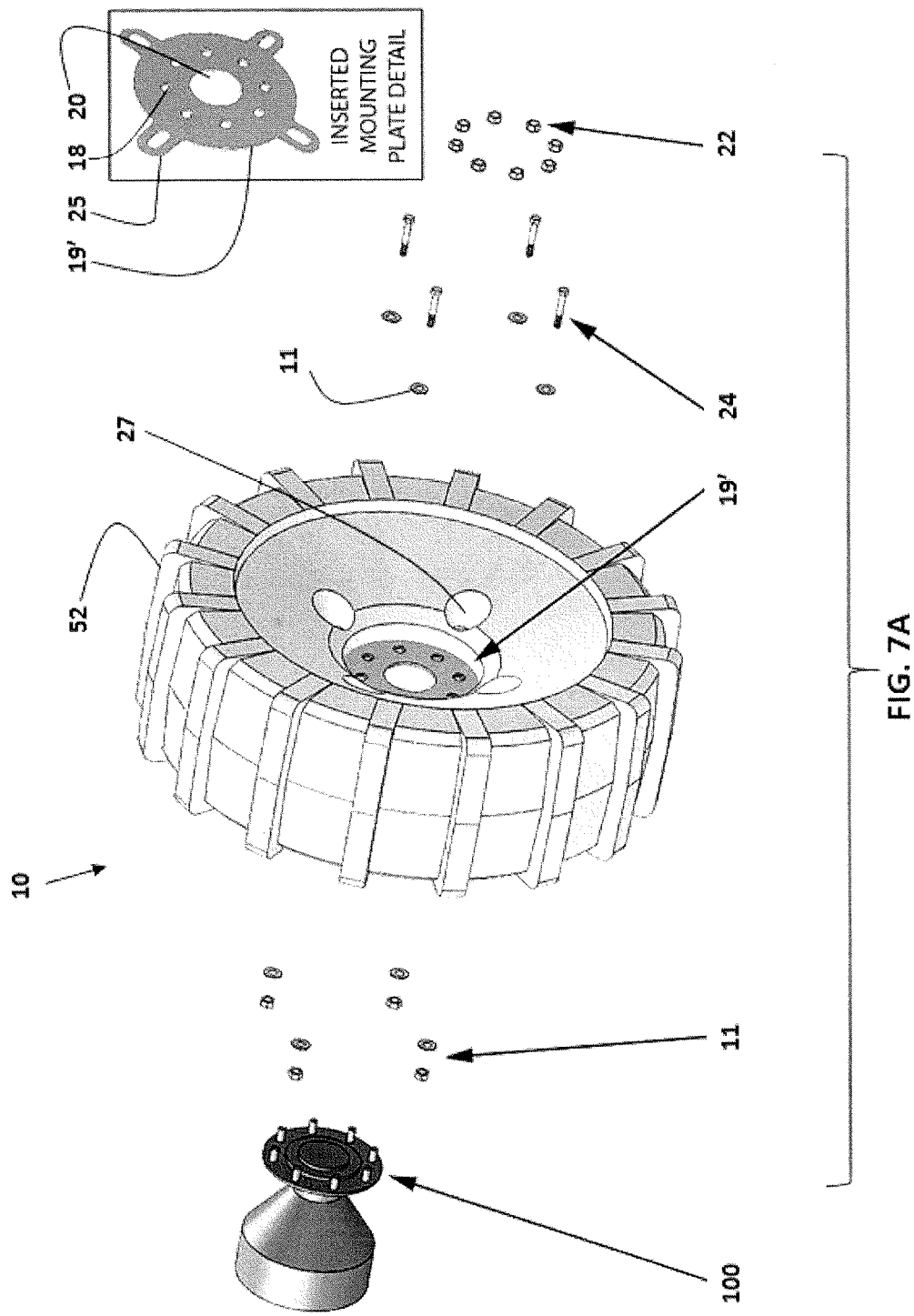

COMBINATION ONE-PIECE MOLDED TIRE AND MOUNTING PLATE

BACKGROUND

In center pivot irrigation systems, water is directed along a long boom pipe to the field to be irrigated. The boom pivots around a center point on spaced apart towers which support the boom. The towers are generally supported by large pneumatic rubber tires similar to conventional tractor tires. The weight supported by each tower is substantial causing the tires to sink deeply into the ground. As the tires roll across muddy soil, the tires tend to push mud to the sides and front of the tire. The accumulated mud pushed to the front of the tire can eventually build up to the point that the tire can no longer advance. This interrupts operation of the irrigation system until the tire can be pulled out of the rut. The tires on such systems are also subject to extensive wear and tear due to their exposure to the elements, the extensive wet/dry cycles, and the general rough terrain in most fields. Pneumatic tires are thus prone to going flat, which also interrupts operation of the irrigation system until the flat tire is repaired or replaced.

Rotational molding is a method of manufacture for primarily hollow or foamed interior plastic objects. Rotational molding or casting (also known as "roto-molding" and "roto-casting") is typically used to produce products that are too large or complicated to be produced by other molding techniques, such as thermoforming or injection molding. Some products commonly formed by rotational molding include garbage can, fuel tanks, storage tanks, casks, and toys.

Rotational molding generally utilizes a shell-like, heated hollow mold which is filled with a charge or shot weight of material. The charged mold is then slowly rotated (usually around two, and sometimes three, perpendicular axes) causing the softened material to disperse and stick to the walls of the mold. To maintain even thickness throughout the part, the mold is continuously rotated at all times during the heating and cooling phases. Rotating the mold during cooling minimizes sagging or other deformation of the molded workpiece during the cooling phase. Generally, then, the roto-molding process takes place in four discrete steps: loading or charging the mold, molding or curing under heated conditions, cooling the mold, and lastly unloading the molded part from the now-cool mold.

When the cover to the mold is open, a powdered plastic resin, which is typically colored, is placed into the mold cavity. The cover is then sealed and the mold is placed in a heated environment in which it is rotated. The heat causes the plastic to melt against the heated inside surface of the mold. The mold continues to rotate during heating, and the plastic gradually becomes distributed evenly on the mold walls through gravitational force. While continuing to rotate, the mold is moved out of the oven to a cooling chamber, where the mold and the plastic are cooled to the point that the molded plastic has cured and is sufficient stiff to retain its molded shape. During cooling, the molded resin typically contracts and pulls away from the mold. Once the molded resin is sufficiently cool and rigid, the molded article is removed from the mold. Additional, post-mold machining may be required to yield the final product.

SUMMARY

Disclosed herein is a combination tire (10) and mounting plate (14, 15, 15', 19, 19') comprising:

a molded, one-piece, non-pneumatic tire (10) comprising an inner circumferential wall (50), an outer circumferential wall (52) coaxial with the inner circumferential wall, and a right sidewall (60) and a left sidewall (62) connecting the inner and outer circumferential walls, wherein the inner circumferential wall defines a central aperture (20') that is coaxial with the inner and outer circumferential walls; in combination with a mounting plate (14) defining a central aperture (20) therein, wherein the mounting plate is configured to be coupled to a hub (100); and a fastener dimensioned and configured to attach the mounting plate to the tire so that the central aperture of the mounting plate is coaxial with the central aperture of the tire.

The fastener may optionally comprise a number of threaded, blind holes (12) defined in the right sidewall or left sidewall of the tire, circumferential to the central aperture in the tire, a corresponding number of apertures defined in the mounting plate that are in registration with the threaded, blind holes, and a corresponding number of threaded bolts dimensioned and configured to pass through the apertures in the mounting plate and engage with the threaded, blind holes in the tire so as to reversibly attach the mounting plate to the tire.

Alternatively, the fastener may optionally comprise a number of through holes (12') passing transversely through the right sidewall and the left sidewall of the tire, circumferential to the central aperture in the tire, a corresponding number of apertures defined in the mounting plate that are in registration with the through holes, and a corresponding number of threaded nuts and bolts, the bolts dimensioned and configured to pass through the apertures in the mounting plate and the through holes in the tire, and to engage with the threaded nuts to reversibly attach the mounting plate to the tire.

In another version of the combination, there is a first mounting plate and a second mounting plate, each mounting plate defining a central aperture therein, wherein each mounting plate is configured to be coupled to a hub, and wherein each mounting plate has defined therein a number of negative features; and the tire further comprises a number positive features on each of the right sidewall and the left sidewall, the number of positive features corresponding to the number of negative features in the first and second mounting plates, and wherein the positive features on the right sidewall are in registration with and dimensioned and configured to matingly engage the negative features on the first mounting plate, and the positive features on the left sidewall are in registration with and dimensioned and configured to matingly engage the negative features on the second mounting plate. The negative features on the first and second mounting plates may be apertures defined in the first and second mounting plates.

Another version of the combination comprises a first mounting plate and a second mounting plate, each mounting plate defining a central aperture therein, wherein each mounting plate is configured to be coupled to a hub, and wherein each mounting plate has defined therein a number of negative features; and the tire further comprises a number positive features on the inner circumferential wall, the number of positive features corresponding to the number of negative features in the first and second mounting plates, and wherein the positive features on the inner circumferential wall are in registration with and dimensioned and configured to matingly engage the negative features on the first and second mounting plates. The negative features on the first and second mounting plates may be apertures defined in the first and second mounting plates. The first and second mounting plates may optionally define a corresponding number of apertures disposed about the central aperture and, in combination, a corresponding number of threaded nuts and bolts, the bolts dimensioned and configured to pass through the apertures in the first and second mounting plates and to engage with the threaded nuts to reversibly attach the first and second mounting plates to each other face-to-face.

In another version of the combination, the mounting plate is a pre-mold or preform that is dimensioned and configured to fit matingly within the central aperture of the tire and is in contact with the inner circumferential wall of the tire and the fastener is a number of ears extending from an outer circumference of the mounting plate, wherein the tire is roto-molded or roto-cast about the mounting plate preform such that the ears extend into the inner circumferential wall of the tire.

There may optionally be a through hole or aperture passing through each ear in the mounting plate. The tire may the optionally comprise a number of through holes passing transversely through the right sidewall and the left sidewall of the tire, circumferential to the central aperture in the tire, the number of through holes corresponding to the number of ears in the mounting plate preform and in registration with the apertures or through holes in each ear of the mounting plate preform.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. The indefinite article "a" when referring to an element in the claims means "one or more," unless explicitly stated to the contrary.

All combinations of method or process steps as used herein can be performed in any order, unless otherwise specified or clearly implied to the contrary by the context in which the referenced combination is made.

The combination disclosed and claimed herein may comprise, consist of, or consist essentially of the essential elements and limitations described herein, as well as any additional or optional ingredients, components, or limitations described herein.

BRIEF DESCRIPTION OF THE DRAWINGS

FIG. 7A is an exploded, right-side perspective rendering of a seventh version of the one-piece tire and mounting plate disclosed herein.

DETAILED DESCRIPTION

Figure 1A:
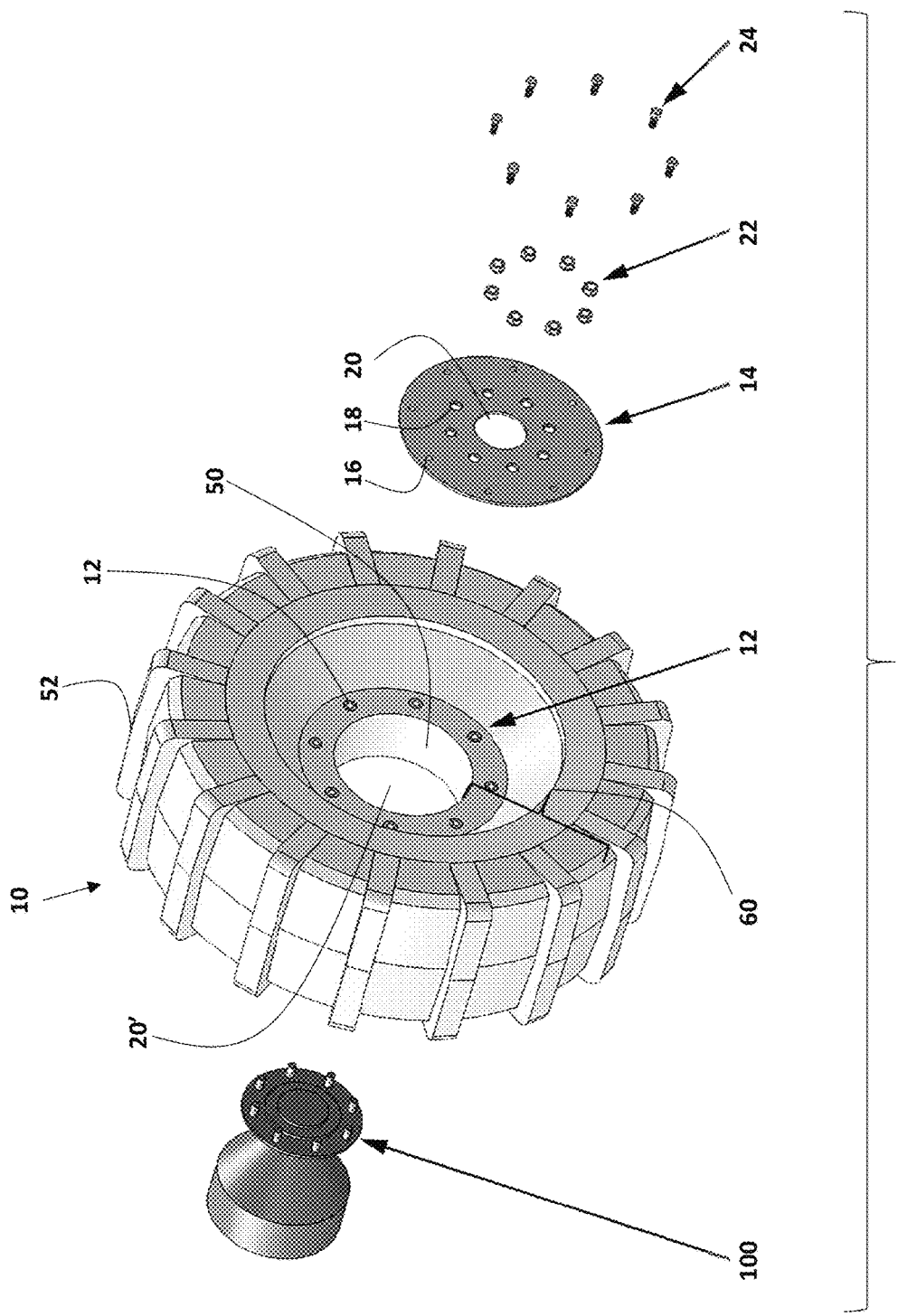
FIG. 1A is an exploded, right-side perspective rendering of a first version of the one-piece tire and mounting plate disclosed herein.

Throughout all the drawings, the same reference numerals are used for the same or corresponding elements in the various versions of the one-piece tire and mounting plate assembly disclosed and claimed herein.

All of the figures depict a one-piece tire 10 which is dimensioned and configured to mount onto a conventional gear box or wheel hub having a plurality of mounting studs/bolts 100. The hub and studs/bolts 100 are of conventional design, are exceedingly well-known, and form no part of the invention claimed herein. Throughout the drawings, the hub 100 is illustrated as having eight (8) mounting studs/bolts. This is for illustration purposes only. The tire disclosed and claimed herein may be dimensioned and configured to mount to a hub with any number of mounting studs/bolts. Typically hubs have anywhere from five (5) to twelve (12) mounting studs/bolts, depending upon the size of the tire/wheel to be attached to the hub and the forces expected to be encountered by the wheel/tire during its intended use.

Additionally, throughout all of the drawing figures, the tire 10 is referred to as being "one-piece." By "one-piece" it is meant that the tire 10 is fabricated as a single, self-contained, monolithic, uniform whole, with no sub-parts. Thus "one-piece" is used herein to distinguish the tire disclosed herein from tires fabricated from two or more distinct sub-elements that are then fastened together by various methods, such as welding, fusing, or otherwise fastening together with bolts, screws, or other fasteners two or more distinct sub-units together to arrive at the competed tire.

The tire 10 disclosed herein is preferably rigid and fabricated from a polymeric resin by injection molding or more preferably still rotational molding (i.e., roto-molding or roto-casting). Roto-molding is conventional and well know, and thus will not be discussed in any great detail. There are many reference works addressing the field. See, for example, Mondini, F., Rombol, E., et al "Rotational Moulding: Theory & Practice," © 2009, Association of Rotational Moulders Australasia (Ipswich, QLD, Australia). See also Glenn L. Beall "Rotational Molding: Design, Materials, Tooling, and Processing," © 1998, Hanser Publications (Cincinnati, Ohio), ISBN 9781569902608. Both of these works are incorporated herein by reference. Very briefly, roto-molding involves a heated, hollow mold which is filled with a charge or shot weight of polymeric material. The mold is then slowly rotated (usually around two perpendicular axes) causing the softened material to disperse and stick to the walls of the mold. To maintain even wall thickness throughout the molded part, the mold is continuously rotated during both the heating phase and the cooling phase. Continuous rotation of the mold during the cooling phase minimizes sagging or other deformations that can occur to the workpiece before the resin has completely set or cured.

A large number of polymer resins can be used to fabricate the tire 10. Any resin that can be roto-molded or roto-cast, without limitation, may be used. A wide range of suitable polymeric materials are available commercially. Preferred materials for fabricating the tire 10 include polyalkylene resins, such as polyethylene, polypropylene, and the like. Polyethylenes (PE) are commercially available in a wide variety of molecular weights, densities, and molecular conformations. The term "polyethylene" is used broad herein to encompass any and all variations, including linear low-density polyethylene (LLDPE), low-density polyethylene (LDPE), ultra-high molecular weight polyethylene (UHMWPE; also known as high-performance polyethylene, HPPE), cross-linked polyethylenes, and recycled/regrind polyethylenes. Other suitable resins for roto-molding include polyvinyl chlorides (PCV), homopolymeric and co-polymeric polyamides (that is, nylons), such as nylon-6 (made from caprolactam), nylon 6.6 (made from hexamethylenediamine and adipic acid), nylon 6/66 (made from caprolactam, hexamethylenediamine and adipic acid) and nylon 66/610 (made from hexamethylenediamine, adipic acid and sebacic acid), and the like. Thermoplastic polyester elastomers may also be used, such as "HYTREL"-brand or "RITEFLEX"-brand resins. ("HYTREL" is a registered trademark of E. I. du Pont de Nemours & Company; "RITEFLEX" is a registered trademark of CAN Holdings LLC.). To the resin may also be added any number conventional and well-known agents such as colorants, anti-static agents, cross-linking agents, flame retardants, flow modifiers, foaming agents, heat stabilizers, impact modifiers, mold release agents, and UV stabilizers. As a general rule of thumb, rotational molding is typically performed using cross-linked polyethylene, linear low density polyethylene, high density polyethylene (HDPE), or polyvinyl chloride (PVC). However, as noted above, any resin that can be roto-molded or roto-cast and which yields a suitable stiff and robust finished product when cured may be used.

Figure 1B:
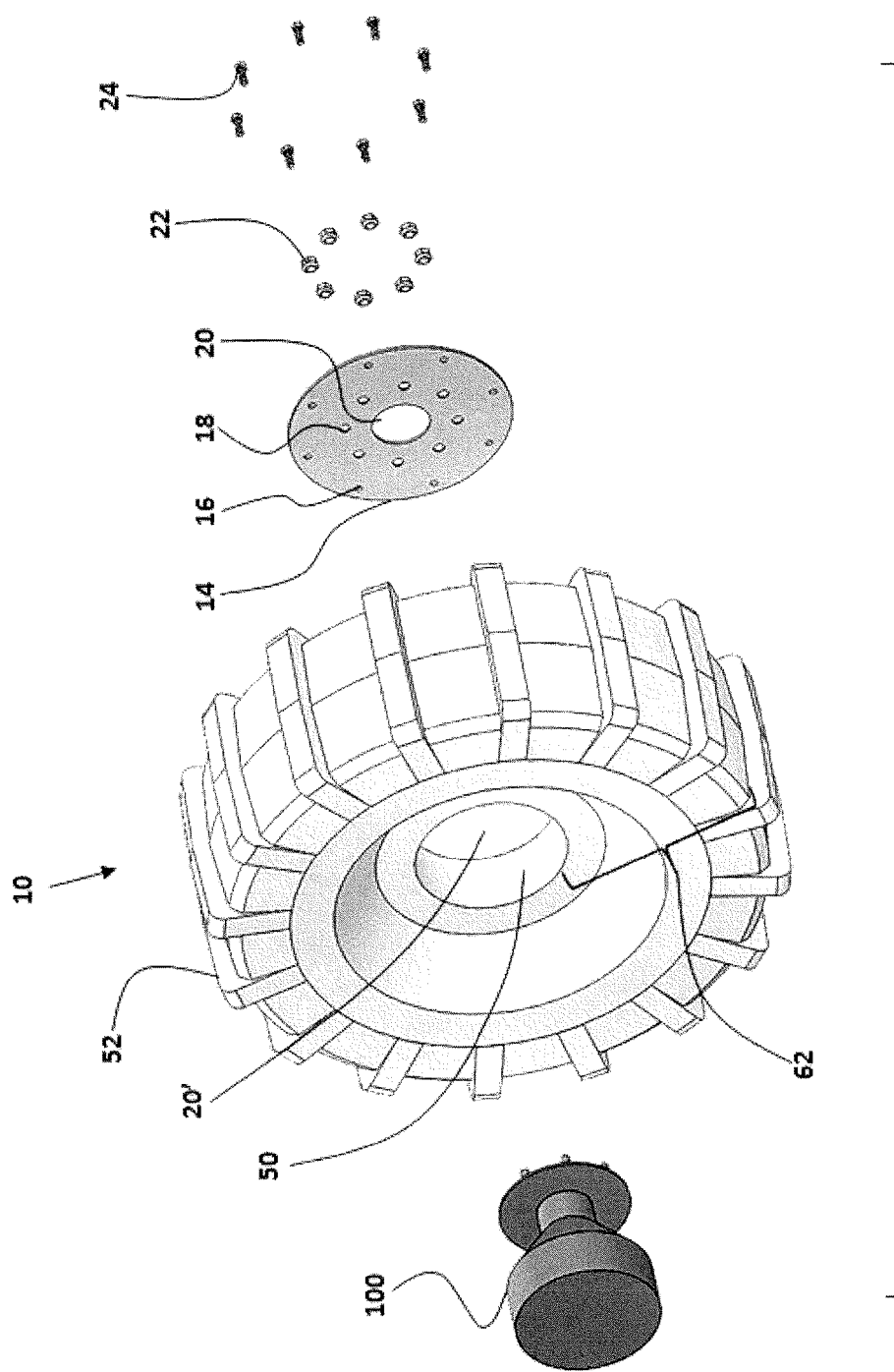
FIG. 1B is an exploded, left-side perspective rendering of a first version of the one-piece tire and mounting plate disclosed herein.

Referring specifically now to FIGS. 1A and 1B, these two figures are a right-side exploded perspective rendering (FIG. 1A) and a left-side exploded perspective rendering (FIG. 1B) of a first version of the tire and mounting plate. The first version includes a one-piece tire 10 with a plurality of threaded blind holes 12. The threaded blind holes may be formed integrally in the tire 10 itself or may comprise a smooth-walled blind hole with a corresponding threaded insert permanently disposed within the smooth-walled blind hole. A mounting plate 14 includes a series of circumferentially placed apertures 16 in registration with the blind holes 12 of tire 10. In this fashion, the mounting plate 14 can be reversibly attached to the wheel 10 via mounting bolts/screws 24 that pass through apertures 16 in mounting plate 14. The mounting bolts/screws 24 matingly engage the threaded blind holes 12 in tire 10. A central aperture 20 in the mounting plate is dimensioned and configured to matingly engage a corresponding central flange on the hub 100 so as to center the tire/mounting plate assembly on the hub 100. The mounting plate 14 also includes a series of apertures 18 that are in registration with, and correspond in number to, the mounting studs on the hub 100. That is, the apertures 18 are dimensioned, located, and configured so that the mounting studs pass through the apertures 18 in the mounting plate 14. The mounting plate 14 with its associated tire 10 is then firmly, but reversibly, attached to the hub 100 using lug nuts 22. In this fashion, the tire 10 is mounted to the hub via the mounting plate 14.

Throughout all of the drawings, the mounting plate(s) (14, 15, 15', 19, and 19', see below) are fabricated from any suitably stiff and durable material, typically metallic or polymeric, such as steel, aluminum, other metals and metal alloys, or the polymer resins listed earlier with respect to the tire 10.

Figure 2A:
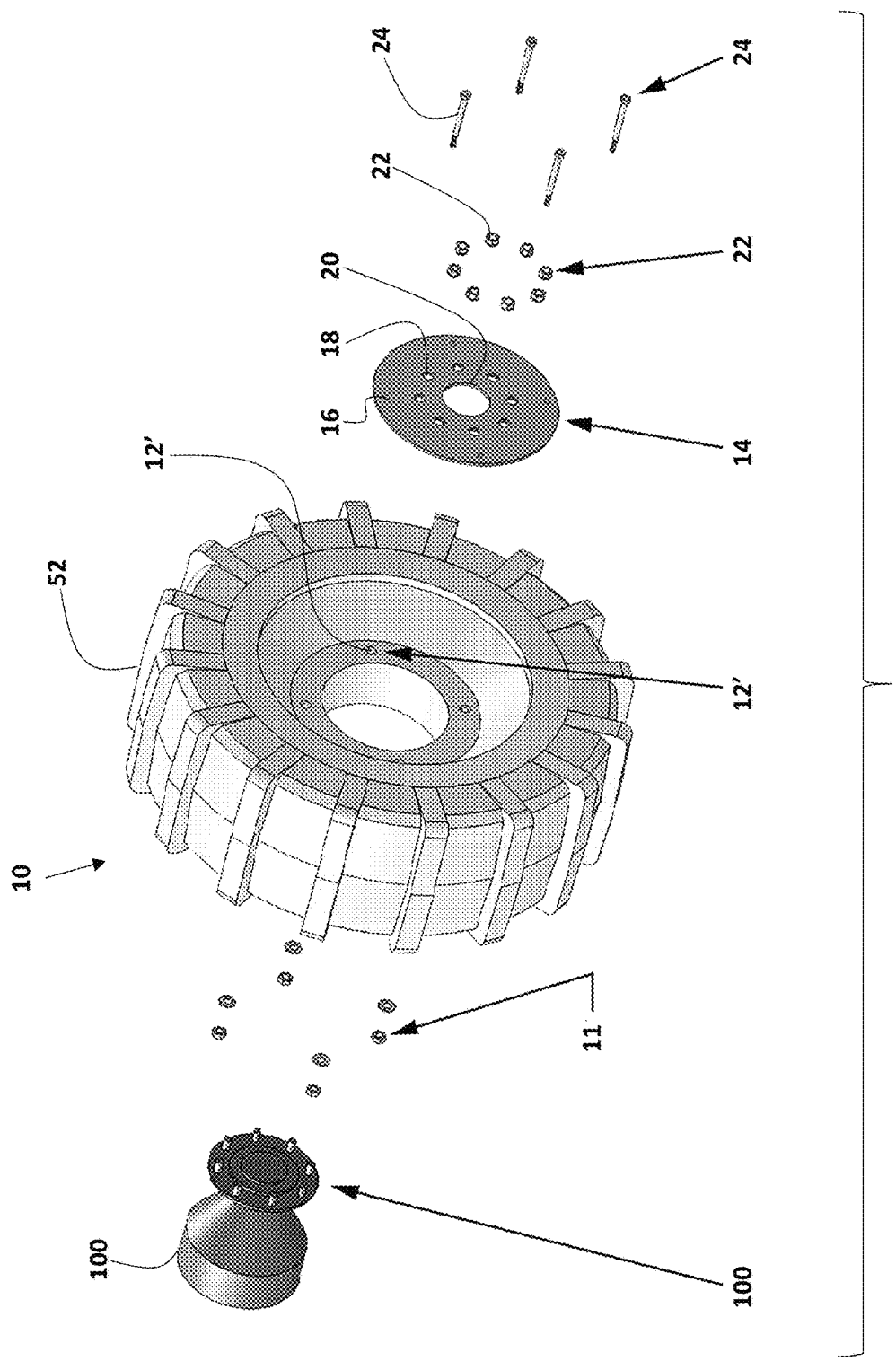
FIG. 2A is an exploded, right-side perspective rendering of a second version of the one-piece tire and mounting plate disclosed herein.
Figure 2B:
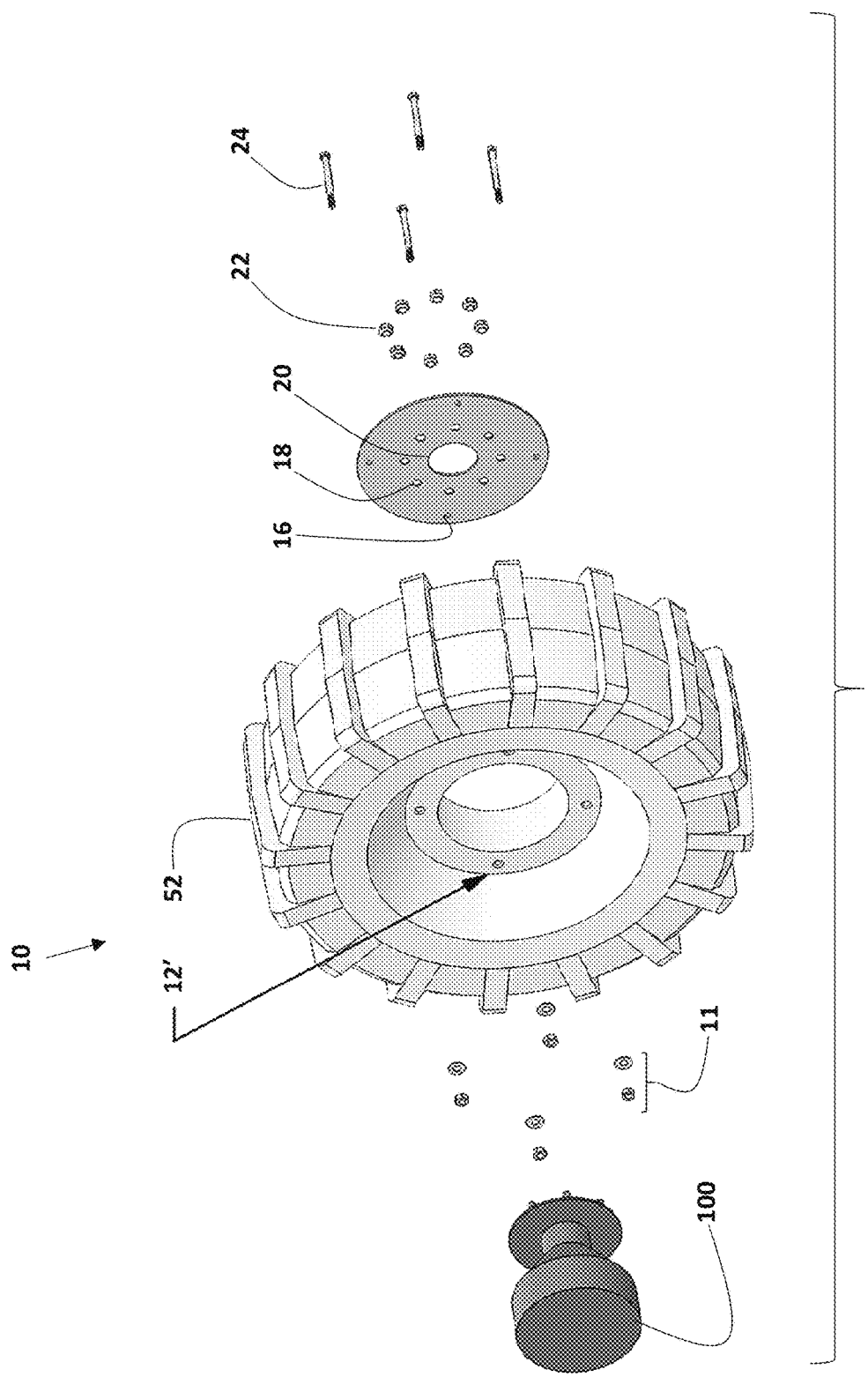
FIG. 2B is an exploded, left-side perspective rendering of a second version of the one-piece tire and mounting plate disclosed herein.

FIGS. 2A and 2B depict a second version of the tire and mounting plate combination. FIG. 2A is a right-side exploded perspective rendering and FIG. 2B is a left-side exploded perspective rendering of the second version of the tire and mounting plate. The second version includes a one-piece tire 10 with a plurality of through holes 12' passing through the right and left sidewalls of the tire. A mounting plate 14 includes a series of circumferentially placed apertures 16 in registration with the through holes 12' of tire 10. The mounting plate 14 is reversibly attached to the wheel 10 via mounting bolts 24 that pass through apertures 16 in mounting plate 14 and through holes 12' in the tire 10. The bolts 24 matingly engage with corresponding fasteners 11, which are depicted in FIGS. 2A and 2B as mating washers and nuts. Again, a central aperture 20 in the mounting plate is dimensioned and configured to matingly engage a corresponding central flange on the hub 100 so as to center the tire/mounting plate assembly on the hub 100. The mounting plate 14 also includes a series of apertures 18 that are in registration with, and correspond in number to, the mounting studs on the hub 100. That is, the apertures 18 are dimensioned, located, and configured so that the mounting studs pass through the apertures 18 in the mounting plate 14. The mounting plate 14 with its associated tire 10 is then attached to the hub 100 using lug nuts 22. In this fashion, the tire 10 is mounted to the hub via the mounting plate 14.

Figure 3A:
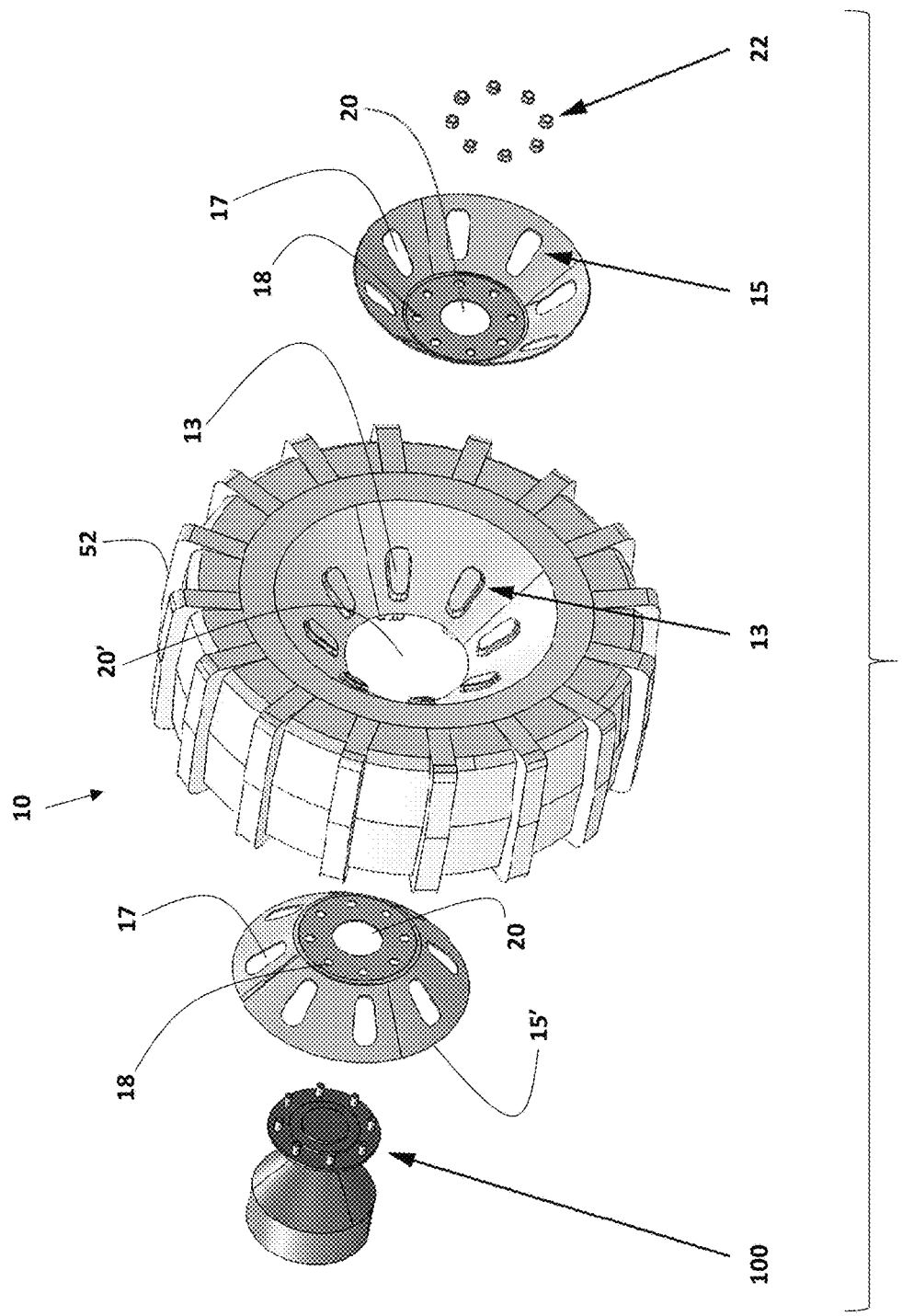
FIG. 3A is an exploded, right-side perspective rendering of a third version of the one-piece tire and mounting plate disclosed herein.
Figure 3B:
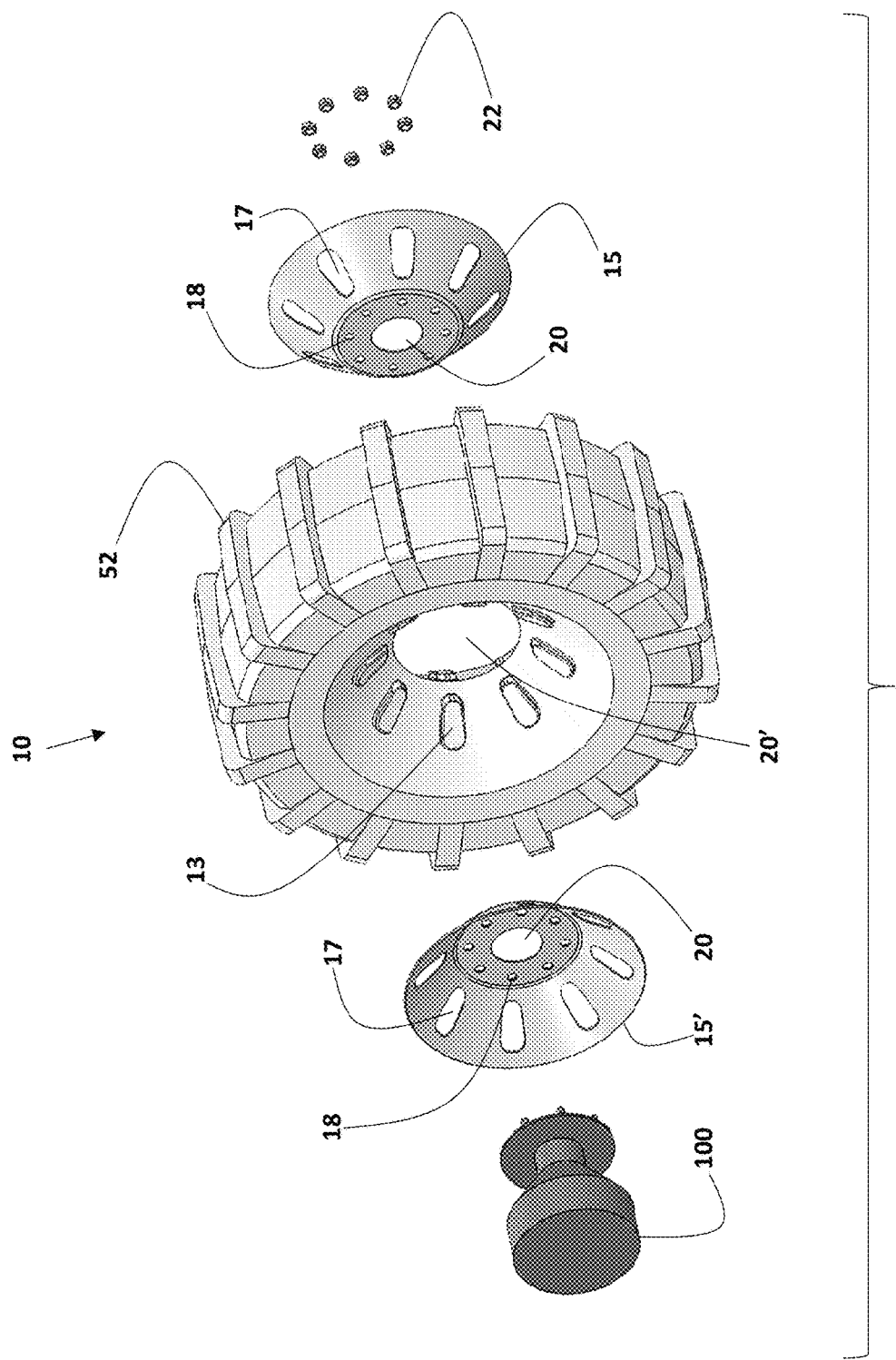
FIG. 3B is an exploded, left-side perspective rendering of a third version of the one-piece tire and mounting plate disclosed herein.

FIGS. 3A and 3B depict a third version of the tire and mounting plate combination. FIG. 3A is a right-side exploded perspective rendering and FIG. 3B is a left-side exploded perspective rendering of the third version of the tire and mounting plates. In the third version, two mounting plates 15 and 15' are present. The third version includes a one-piece tire 10 having a plurality of positive, outward extending features 13 molded adjacent to and around the perimeter of the central aperture 20' in the tire 10, on both the right side (FIG. 3A) and the left side (FIG. 3B). As shown in FIGS. 3A and 3B, the positive, outward extending features 13 extend from the conical, sidewall portion of the tire 10, adjacent to the central aperture 20'. Thus, the mounting plates 15 and 15' have gently sloping sidewalls that mirror or correspond to conical sidewall portion of the tire 10. Generally speaking, in the third version of the device, the mounting plates 15 and 15' do not extend through the central aperture, but rather "meet in the middle" and are held in place by the mating interaction of the positive features 13 and the corresponding negative features 17 in each mounting plate. The entire combination of elements is then firmly secured via lug nuts 22 which screw onto mounting studs on hub 100. Each mounting plate 15 and 15' includes a plurality of apertures 17. The negative features 17 (depicted as apertures in the figures) are dimensioned, located, and configured so that they matingly engage (via friction) the positive, outward extending features 13 of the tire 10. A central aperture 20 in each mounting plate 15 and 15' is dimensioned and configured to matingly engage a corresponding central flange on the hub 100 so as to center the tire/mounting plate assembly on the hub 100. Each mounting plate 15 and 15' also includes a series of apertures 18 that are in registration with, and correspond in number to, the mounting studs on the hub 100. That is, the apertures 18 are dimensioned, located, and configured so that the mounting studs pass through the apertures 18 in the mounting plates 15 and 15'. The mounting plates 15 and 15' with their associated tire 10 are then attached to the hub 100 using lug nuts 22. In this fashion, the tire 10 is mounted to the hub via the mounting plates 15 and 15'.

Figure 4A:
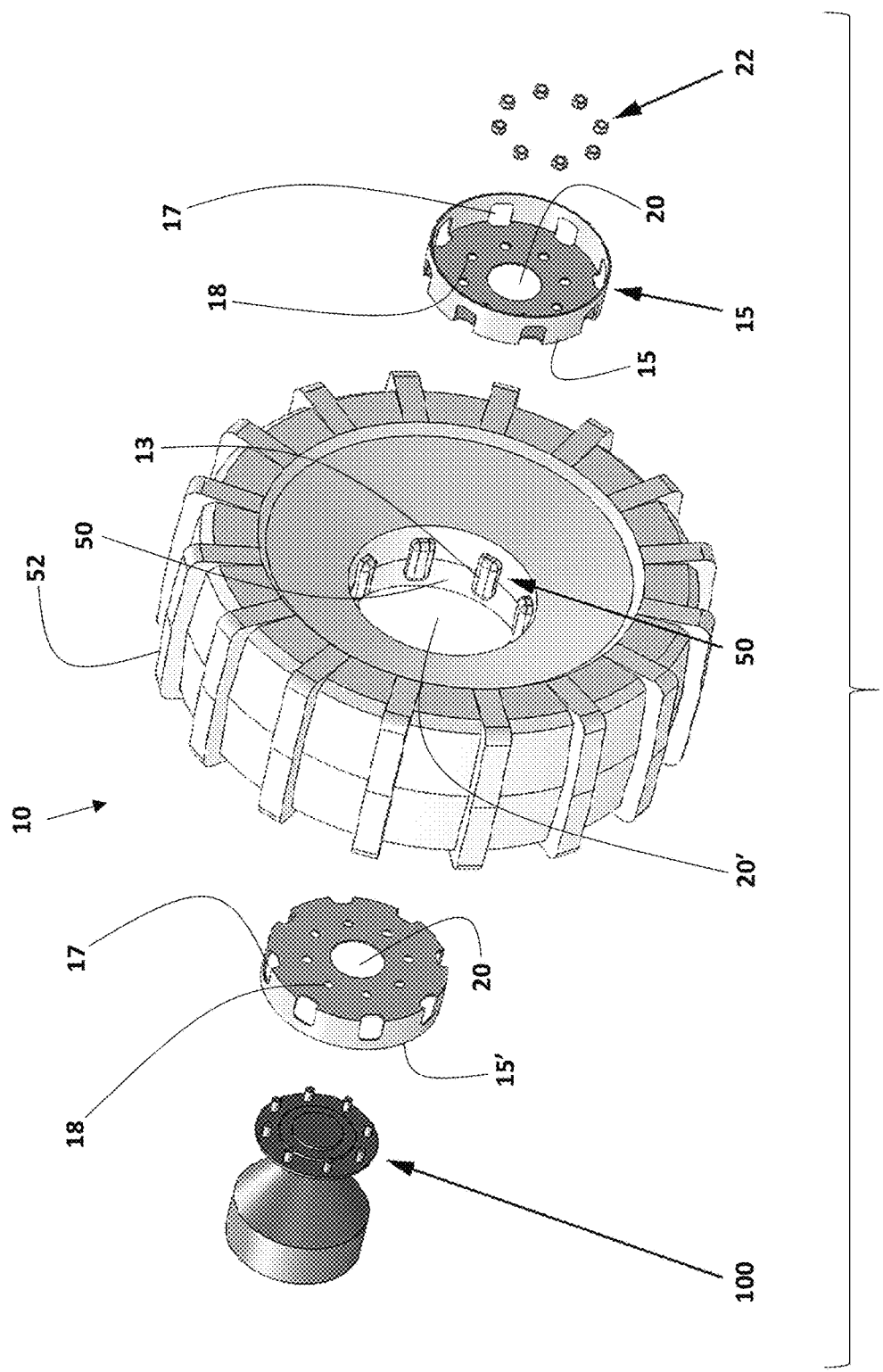
FIG. 4A is an exploded, right-side perspective rendering of a fourth version of the one-piece tire and mounting plate disclosed herein.
Figure 4B:
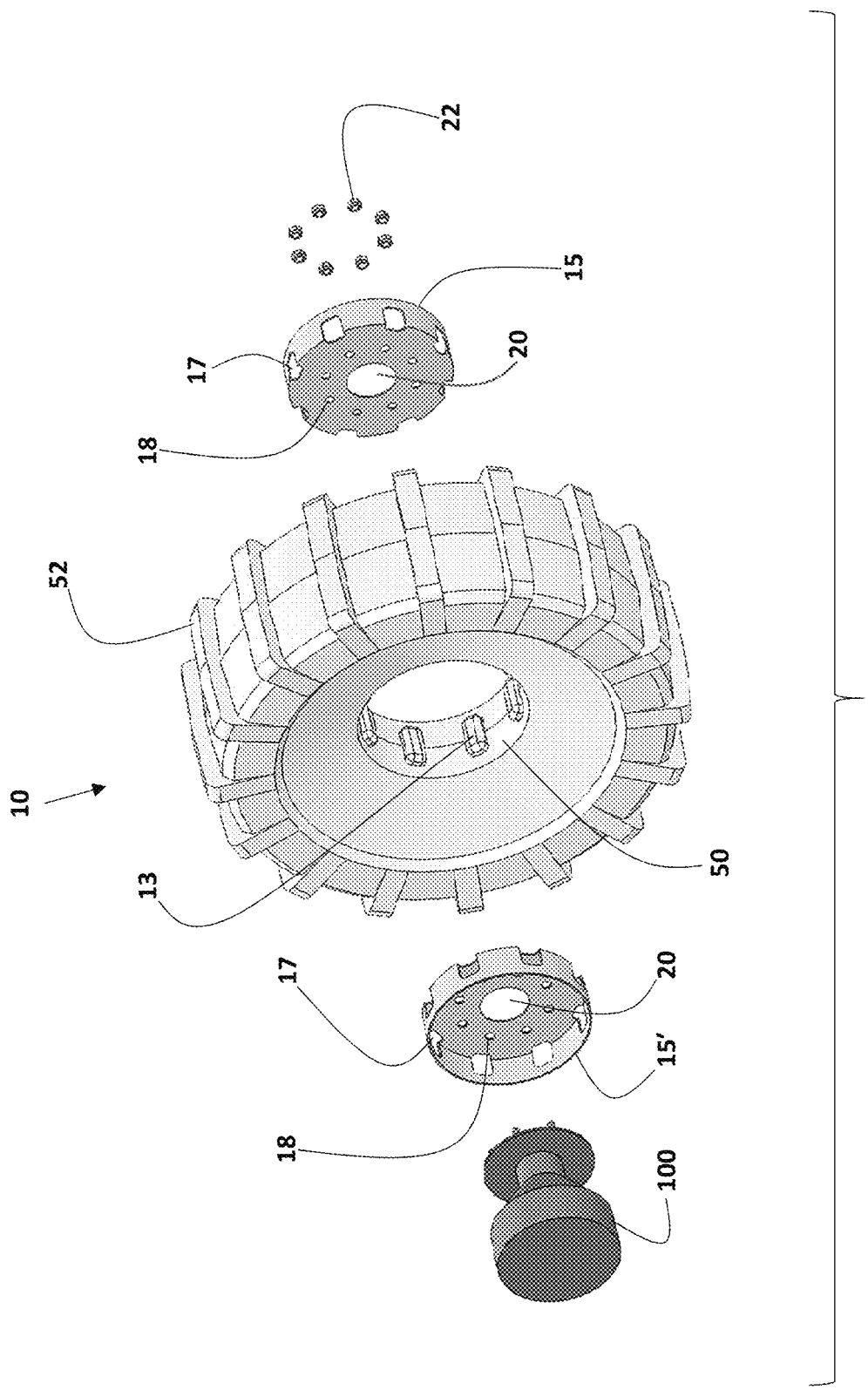
FIG. 4B is an exploded, left-side perspective rendering of a fourth version of the one-piece tire and mounting plate disclosed herein.

FIGS. 4A and 4B depict a fourth version of the tire and mounting plate combination. FIG. 4A is a right-side exploded perspective rendering and FIG. 4B is a left-side exploded perspective rendering of the fourth version of the tire and mounting plates. In the fourth version, again two mounting plates 15 and 15' are present. In contrast to the third version, the fourth version includes a one-piece tire 10 having a central surface 21, coaxial to the outer, treaded surface of the tire. The central surface 21 surrounds and defines the circumference of the central aperture 20' The central surface 21 includes a plurality of positive, outward extending features 13. These positive, outward extending features generally extend through the longitudinal plane of the tire, extending transversely across the right and left portions of the tire. In this fourth version of the tire/mounting plate combination, each mounting plate 15 and 15' includes a plurality of apertures 17. The apertures 17 are dimensioned, located, and configured so that they matingly engage the positive, outward extending features 13 on the central surface 21 of the tire 10. A central aperture 20 in each mounting plate 15 and 15' is dimensioned and configured to matingly engage a corresponding central flange on the hub 100 so as to center the tire/mounting plate assembly on the hub 100. Each mounting plate 15 and 15' also includes a series of apertures 18 that are in registration with, and correspond in number to, the mounting studs on the hub 100. That is, the apertures 18 are dimensioned, located, and configured so that the mounting studs pass through the apertures 18 in the mounting plates 15 and 15'. The mounting plates 15 and 15' with their associated tire 10 are then attached to the hub 100 using lug nuts 22. In this fashion, the tire 10 is mounted to the hub via the mounting plates 15 and 15'. The mounting plates 15 and 15' are cup-like in configuration and fit tightly within the central aperture 20' of the tire via the cooperation between the raised, outwardly extending features 13 and the corresponding apertures 17 on each mounting plate 15 and 15'. In the fourth version of the tire/mounting plate combination, the two mounting plates 15 and 15' are urged toward each other in the central aperture 20' of the tire 10 via the lug nuts 22, which thread onto the mounting studs/bolts on hub 100.

Figure 5A:
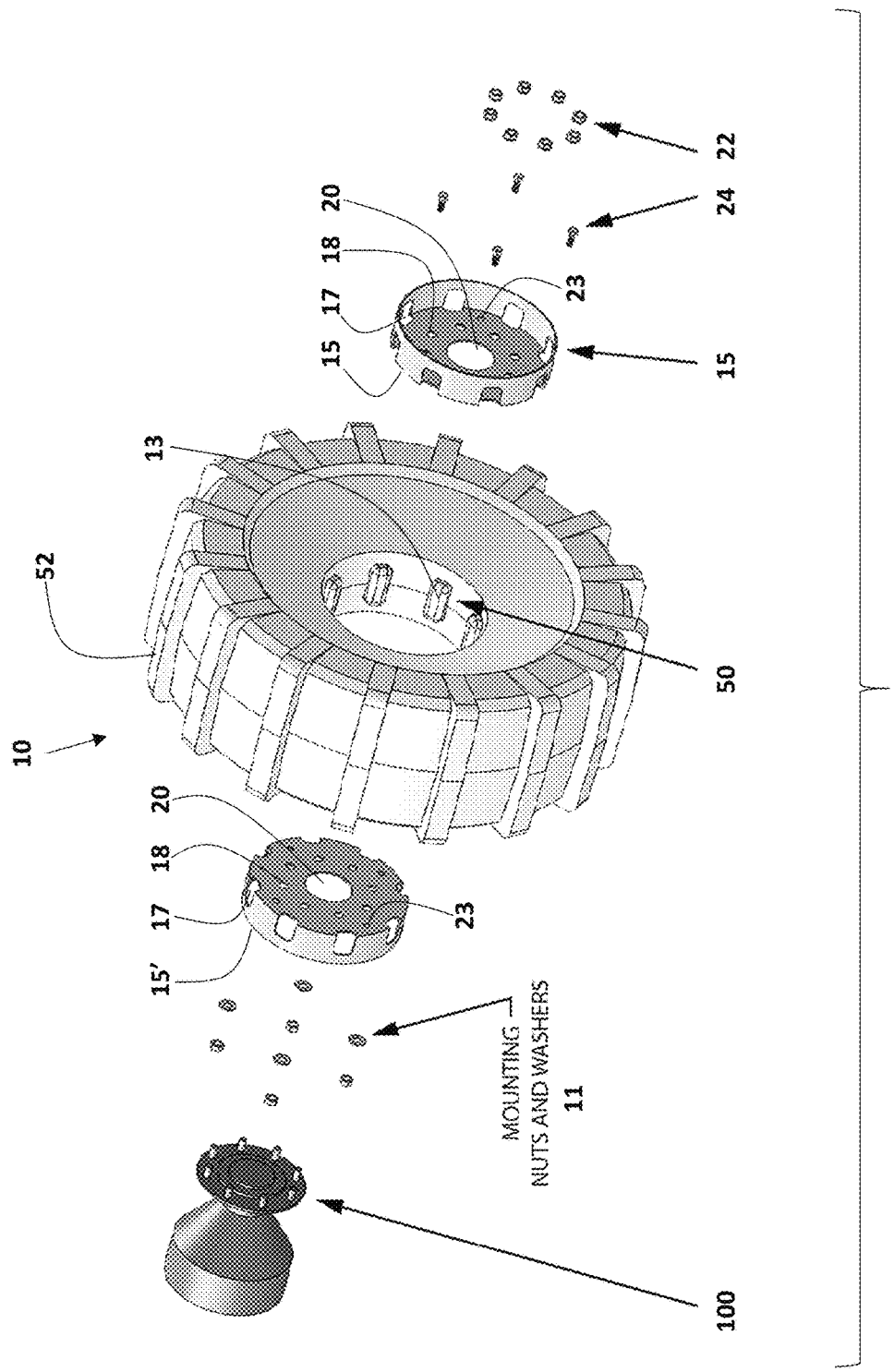
FIG. 5A is an exploded, right-side perspective rendering of a fifth version of the one-piece tire and mounting plate disclosed herein.
Figure 5B:
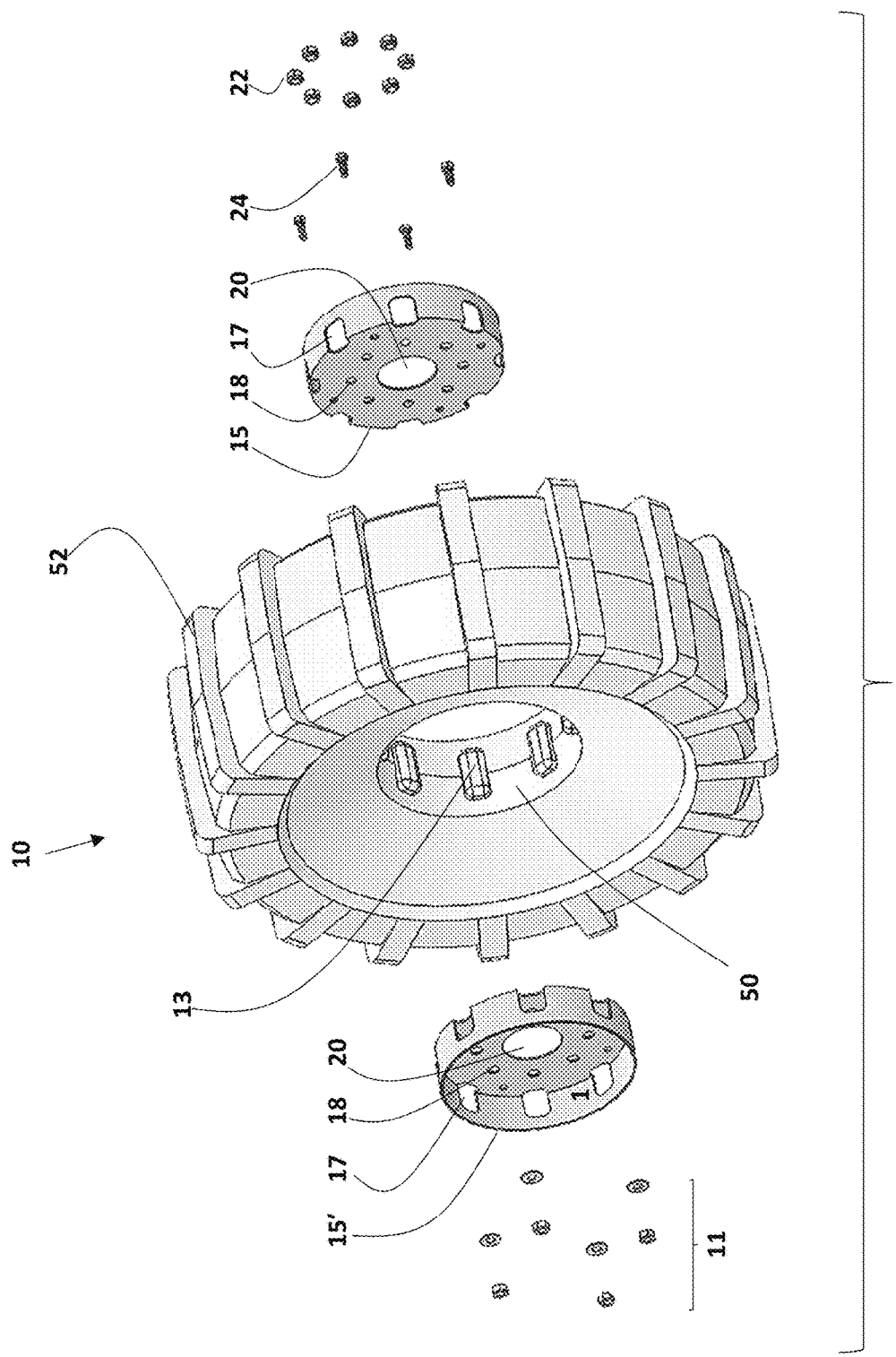
FIG. 5B is an exploded, left-side perspective rendering of a fifth version of the one-piece tire and mounting plate disclosed herein.

FIGS. 5A and 5B depict a fifth version of the tire and mounting plate combination. FIG. 5A is a right-side exploded perspective rendering and FIG. 5B is a left-side exploded perspective rendering of the fifth version of the tire and mounting plates. This version is very much like the fourth version, but the mounting plates 15 and 15' are fasted to each other within the central aperture 20' via mounting bolts 24 and corresponding nuts/washers 11. The mounting bolts 24 pass through a corresponding number of apertures 23 in each of the mounting plates 15 and 15' (the number of apertures corresponding to the number of bolts, one bolt per aperture). In the fifth version (as in the fourth), two mounting plates 15 and 15' are present. The fifth version shown in FIGS. 5A and 5B includes a one-piece tire 10 having a central surface 21, coaxial to the outer, treaded surface of the tire. The central surface 21 surrounds and defines the circumference of the central aperture 20' The central surface 21 includes a plurality of positive, outward extending features 13. These positive, outward extending features generally extend through the longitudinal plane of the tire, extending transversely across the right and left portions of the tire. In this fifth version of the tire/mounting plate combination, each mounting plate 15 and 15' includes a plurality of apertures 17. The apertures 17 are dimensioned, located, and configured so that they matingly engage the positive, outward extending features 13 on the central surface 21 of the tire 10. A central aperture 20 in each mounting plate 15 and 15' is dimensioned and configured to matingly engage a corresponding central flange on the hub 100 so as to center the tire/mounting plate assembly on the hub 100. Each mounting plate 15 and 15' also includes a series of apertures 18 that are in registration with, and correspond in number to, the mounting studs on the hub 100. That is, the apertures 18 are dimensioned, located, and configured so that the mounting studs pass through the apertures 18 in the mounting plates 15 and 15'. The mounting plates 15 and 15' with their associated tire 10 are then attached to the hub 100 using lug nuts 22. In this fashion, the tire 10 is mounted to the hub via the mounting plates 15 and 15'. The mounting plates 15 and 15' are cup-like in configuration and fit tightly within the central aperture 20' of the tire via the cooperation between the raised, outwardly extending features 13 and the corresponding apertures 17 on each mounting plate 15 and 15'.

Figure 6A:
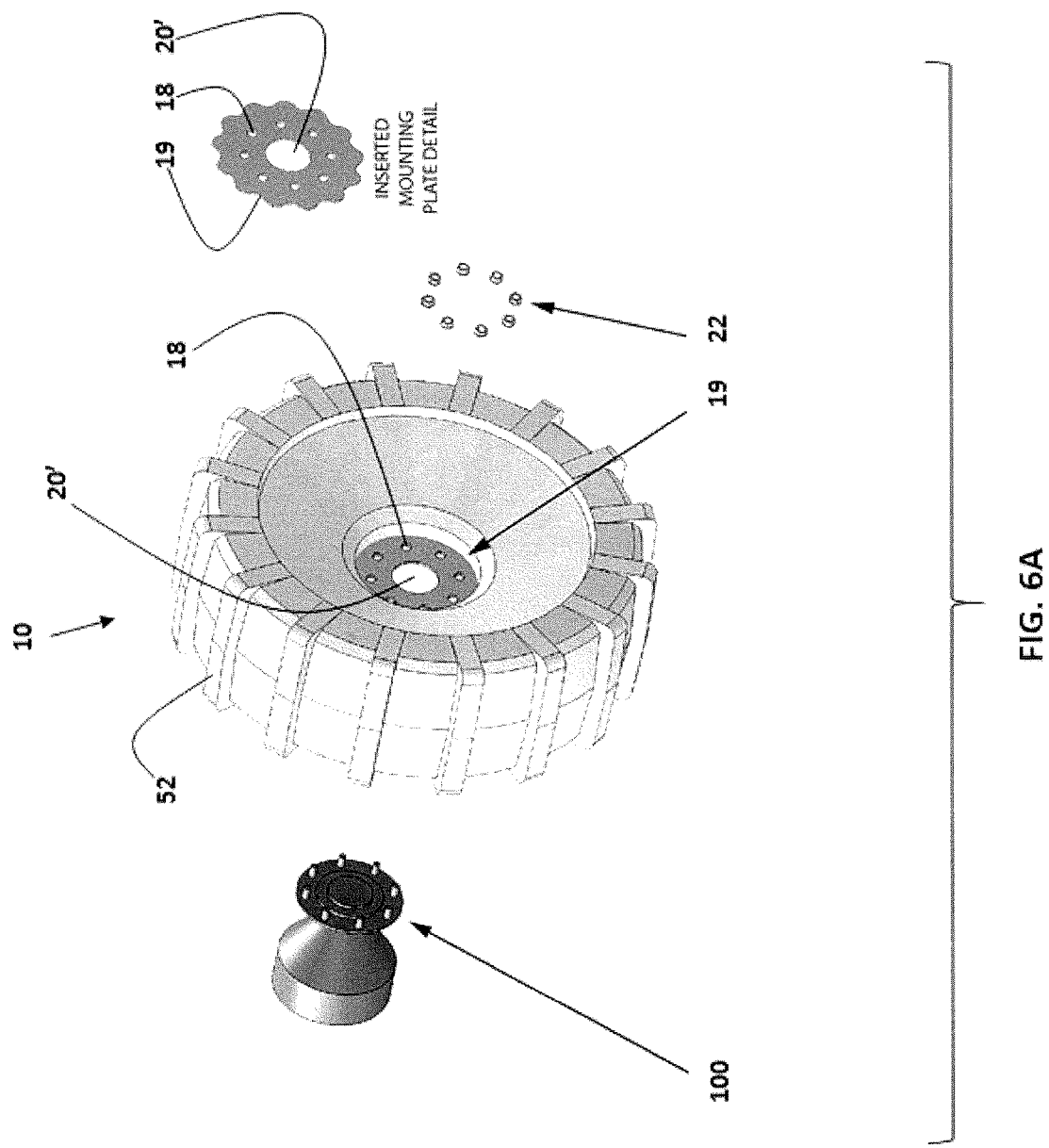
FIG. 6A is an exploded, right-side perspective rendering of a sixth version of the one-piece tire and mounting plate disclosed herein.
Figure 6B:
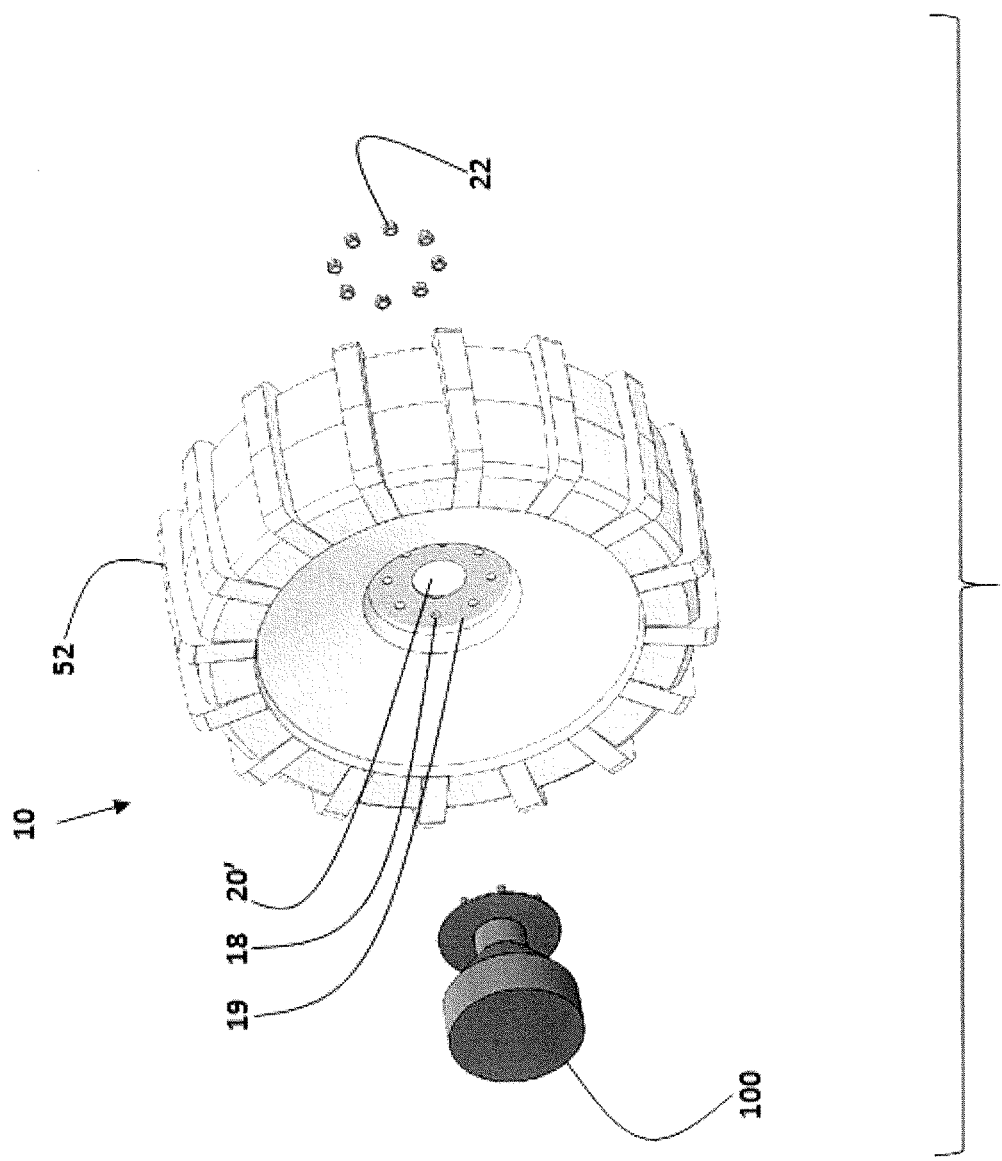
FIG. 6B is an exploded, left-side perspective rendering of a sixth version of the one-piece tire and mounting plate disclosed herein.

FIGS. 6A and 6B are a right-side exploded perspective rendering (FIG. 6A) and a left-side exploded perspective rendering (FIG. 6B) of a sixth version of the tire and mounting plate. The sixth version includes a one-piece tire 10 with a central aperture (unnumbered in FIGS. 6A and 6B) A mounting plate 19 includes a central aperture 20' and a series of circumferentially placed apertures 18. The central aperture 20' in the mounting plate 19 is dimensioned and configured to matingly engage a corresponding central flange on the hub 100 so as to center the tire/mounting plate assembly on the hub 100. The apertures 18 in mounting plate 19 are in registration with, and correspond in number to, the mounting studs on the hub 100. That is, the apertures 18 are dimensioned, located, and configured so that the mounting studs pass through the apertures 18 in the mounting plate 19. The mounting plate 19 with its associated tire 10 is then firmly, but reversibly, attached to the hub 100 using lug nuts 22. In this fashion, the tire 10 is mounted to the hub via the mounting plate 14. The mounting plate 19 is dimensioned and configured as a pre-mold. That is, the mounting plate 19 is suspended within the proper location with the rotational mold used to fabricate tire 10 so that the mounting plate ends up disposed within the central aperture of the tire 10. The tire 10 is then roto-molded or roto-cast in standard fashion, and is thus cast about the mounting plate 19.

Figure 7B:
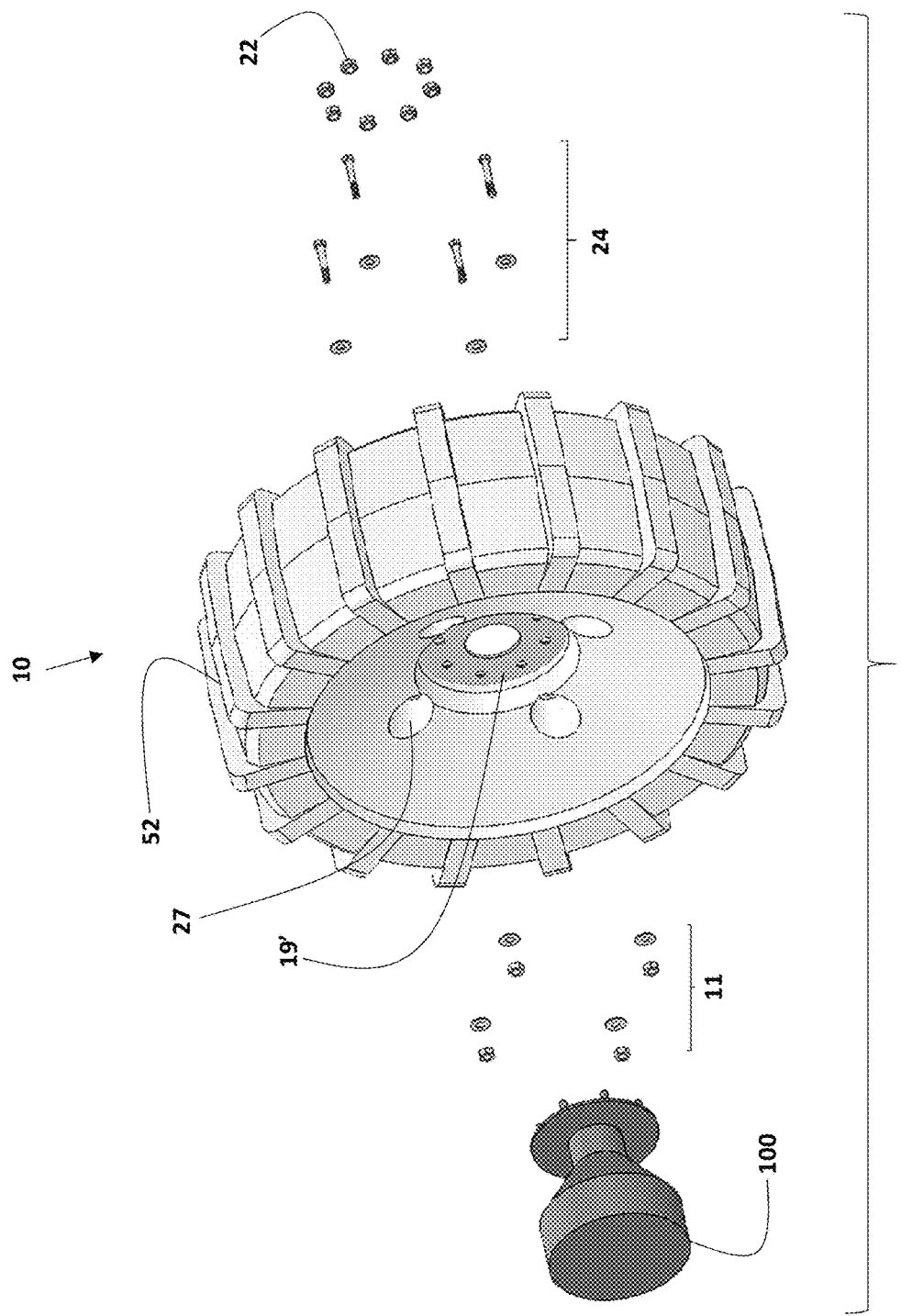
FIG. 7B is an exploded, left-side perspective rendering of a seventh version of the one-piece tire and mounting plate disclosed herein.

FIGS. 7A and 7B are a right-side exploded perspective rendering (FIG. 7A) and a left-side exploded perspective rendering (FIG. 7B) of a seventh version of the tire and mounting plate. The seventh version includes a one-piece tire 10 with a central aperture (unnumbered in FIGS. 7A and 7B) A mounting plate 19' includes a central aperture 20 and a series of circumferentially placed apertures 18. The central aperture 20 in the mounting plate 19' is dimensioned and configured to matingly engage a corresponding central flange on the hub 100 so as to center the tire/mounting plate assembly on the hub 100. The apertures 18 in mounting plate 19' are in registration with, and correspond in number to, the mounting studs on the hub 100. That is, the apertures 18 are dimensioned, located, and configured so that the mounting studs pass through the apertures 18 in the mounting plate 19'. The mounting plate 19' with its associated tire 10 is then firmly, but reversibly, attached to the hub 100 using lug nuts 22. In this fashion, the tire 10 is mounted to the hub via the mounting plate 19'. The mounting plate 19' also includes a plurality of circumferentially placed ears 25 having apertures therein that correspond with and are in registration with a corresponding plurality of through holes 27 in the tire 10. In the same fashion as in the sixth version, the mounting plate 19' is dimensioned and configured as a preform or pre-mold. That is, the mounting plate 19' is suspended within the proper location inside the rotational mold used to fabricate tire 10 so that the mounting plate is disposed within the central aperture of the tire 10. Additionally, the mounting place is suspended within the mold so that apertures in ears 25 in mounting plate 19' are in registration with the through holes 27 in the tire 10. The tire 10 is then roto-molded or roto-cast in standard fashion, and is thus formed about the mounting plate 19'. A corresponding number of fasteners (such as bolts 24 and nuts/washers 11) are provided to pass through the apertures in ears 25 and through holes 27, thereby firmly fixing the mounting plate 19' within the central aperture of the tire 10.

What is claimed is:

1. A combination tire and mounting plate comprising:
   a molded, one-piece, non-pneumatic tire comprising an inner circumferential wall, an outer circumferential wall coaxial with the inner circumferential wall, and a right sidewall and a left sidewall connecting the inner and outer circumferential walls, wherein the inner circumferential wall defines a central aperture that is coaxial with the inner and outer circumferential walls; in combination with
   a first mounting plate and a second mounting plate, each mounting plate defining a central aperture therein, wherein each mounting plate is configured to be coupled to a hub, and wherein each mounting plate has defined therein a number of negative features; and
   the tire further comprises a number positive features on each of the right sidewall and the left sidewall, the number of positive features corresponding to the number of negative features in the first and second mounting plates, and
   wherein the positive features on the right sidewall are in registration with and dimensioned and configured to matingly engage the negative features on the first mounting plate, and the positive features on the left sidewall are in registration with and dimensioned and configured to matingly engage the negative features on the second mounting plate; and
   a fastener dimensioned and configured to attach the mounting plates to the tire so that the central apertures of the mounting plates are coaxial with the central aperture of the tire.

2. The combination of claim 1, wherein the negative features on the first and second mounting plates are apertures defined in the first and second mounting plates.

3. A combination tire and mounting plate comprising:
   a molded, one-piece, non-pneumatic tire comprising an inner circumferential wall, an outer circumferential wall coaxial with the inner circumferential wall, and a right sidewall and a left sidewall connecting the inner and outer circumferential walls, wherein the inner circumferential wall defines a central aperture that is coaxial with the inner and outer circumferential walls; in combination with
   a first mounting plate and a second mounting plate, each mounting plate defining a central aperture therein, wherein each mounting plate is configured to be coupled to a hub, and wherein each mounting plate has defined therein a number of negative features; and
   the tire further comprises a number positive features on the inner circumferential wall, the number of positive features corresponding to the number of negative features in the first and second mounting plates, and
   wherein the positive features on the inner circumferential wall are in registration with and dimensioned and configured to matingly engage the negative features on the first and second mounting plates; and
   a fastener dimensioned and configured to attach the mounting plates to the tire so that the central apertures of the mounting plates are coaxial with the central aperture of the tire.

4. The combination of claim 3, wherein the negative features on the first and second mounting plates are apertures defined in the first and second mounting plates.

5. The combination of claim 3, wherein the first and second mounting plate define a corresponding number of apertures disposed about the central aperture and, in combination, a corresponding number of threaded nuts and bolts, the bolts dimensioned and configured to pass through the apertures in the first and second mounting plates and to engage with the threaded nuts to reversibly attach the first and second mounting plates to each other face-to-face.

6. A combination tire and mounting plate comprising:
   a molded, one-piece, non-pneumatic tire comprising an inner circumferential wall, an outer circumferential wall coaxial with the inner circumferential wall, and a right sidewall and a left sidewall connecting the inner and outer circumferential walls, wherein the inner circumferential wall defines a central aperture that is coaxial with the inner and outer circumferential walls; in combination with
   a mounting plate defining a central aperture therein, wherein the mounting plate is configured to be coupled to a hub; and
   a fastener dimensioned and configured to attach the mounting plate to the tire so that the central aperture of the mounting plate is coaxial with the central aperture of the tire;
   wherein the mounting plate is a preform dimensioned and configured to fit matingly within the central aperture of the tire and in contact with the inner circumferential wall of the tire and the fastener is a number of ears extending from an outer circumference of the mounting plate, wherein the tire is roto-molded or roto-cast about the mounting plate preform such that the ears extend into the inner circumferential wall of the tire.

7. The combination of claim 6, wherein each ear in the mounting plate preform defines an aperture.

8. The combination of claim 7, wherein the tire comprises a number of through holes passing transversely through the right sidewall and the left sidewall of the tire, circumferential to the central aperture in the tire, the number of through holes corresponding to the number of ears in the mounting plate preform and in registration with the apertures in each ear of the mounting plate preform.

\* \* \* \* \*